Nov. 30, 1943.  W. B. KLEMPERER ET AL  2,335,286
AIRCRAFT GUNNERY DEVICE
Filed July 17, 1939  4 Sheets-Sheet 1

Wolfgang B. Klemperer
and Alfred Corte,
INVENTORS.
BY
ATTORNEY.

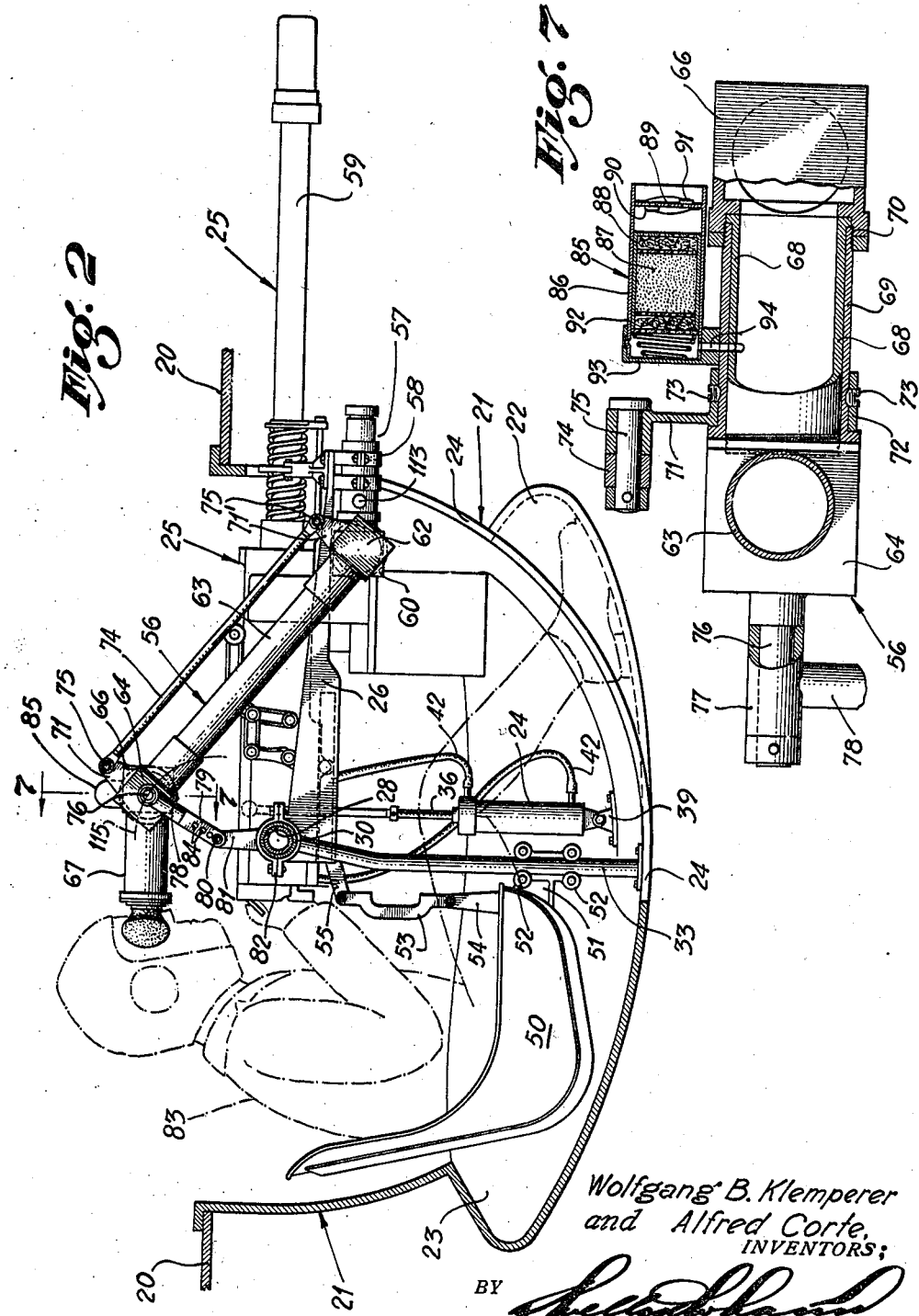

Nov. 30, 1943.   W. B. KLEMPERER ET AL   2,335,286
AIRCRAFT GUNNERY DEVICE
Filed July 17, 1939         4 Sheets-Sheet 3
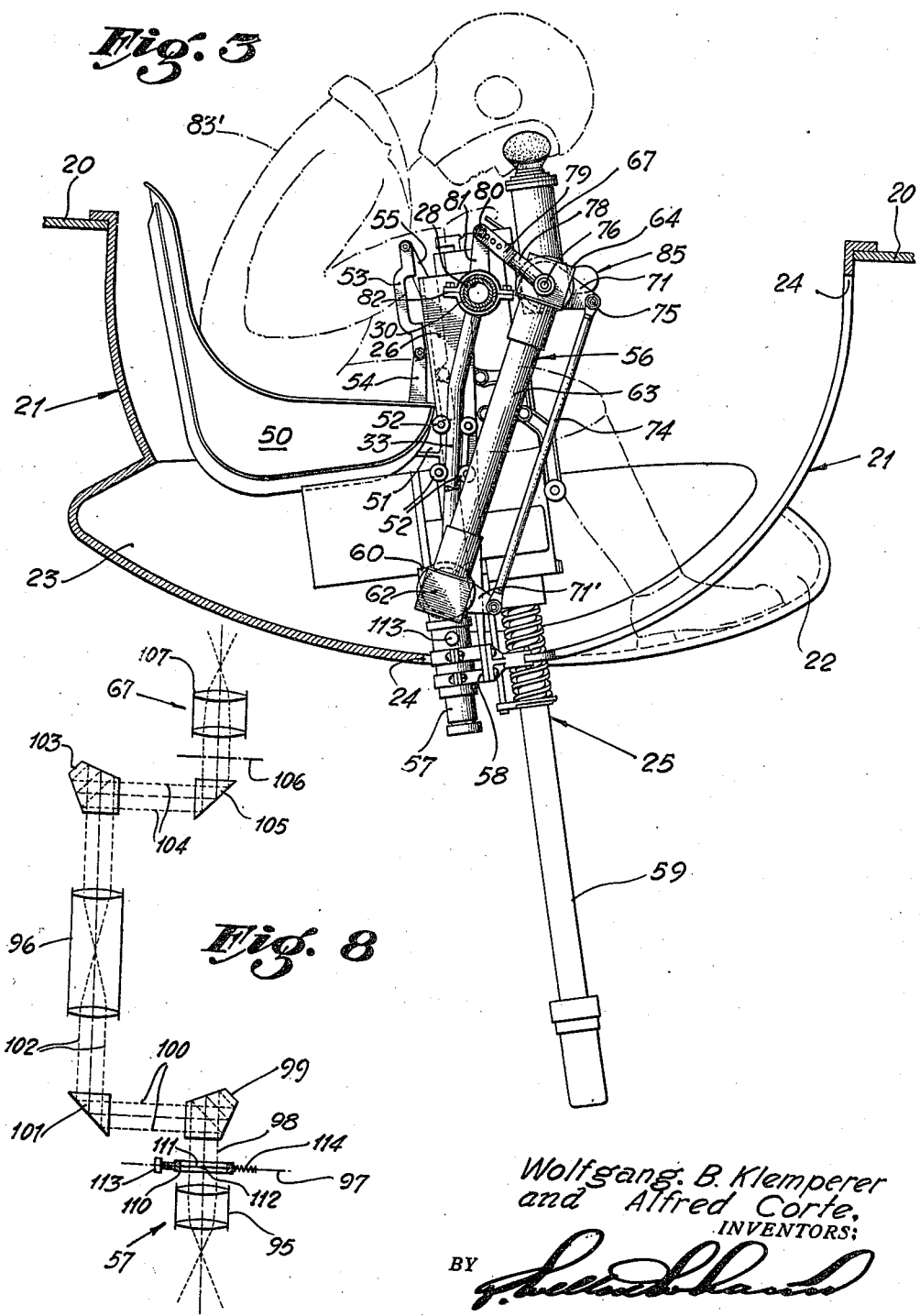
Fig. 5
Fig. 8
Wolfgang. B. Klemperer
and  Alfred Corte,
INVENTORS;
BY
ATTORNEY.

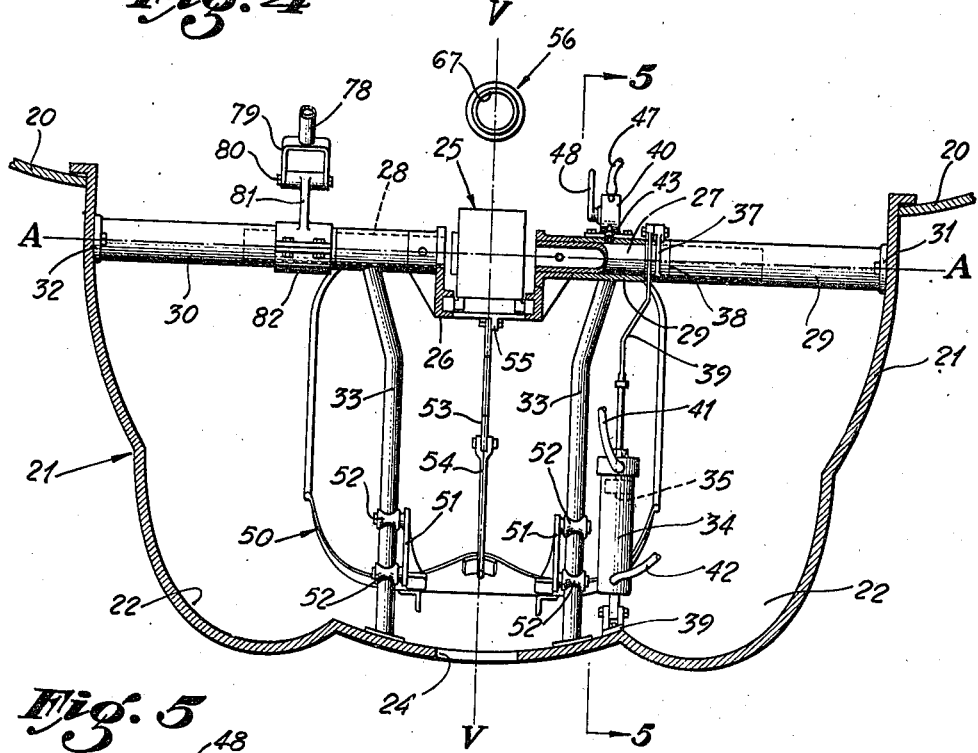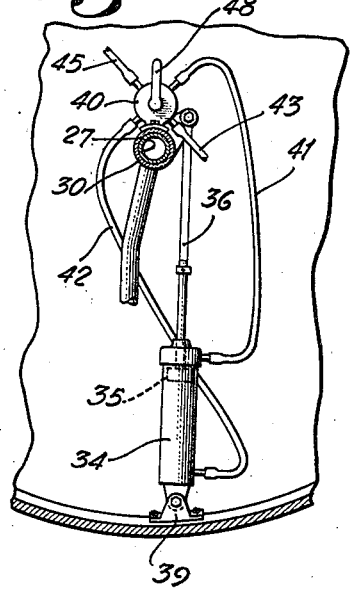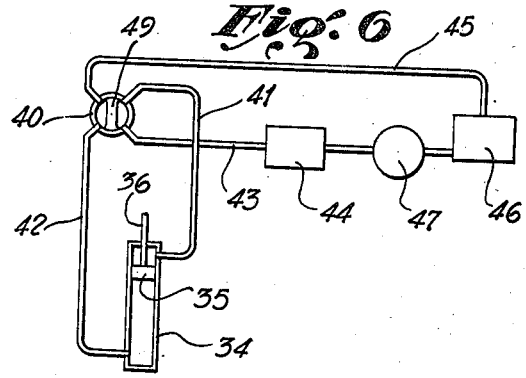

Patented Nov. 30, 1943

2,335,286

UNITED STATES PATENT OFFICE 2,335,286

AIRCRAFT GUNNERY DEVICE

Wolfgang B. Klemperer, Los Angeles, and Alfred Corte, Pacific Palisades, Calif., assignors to Douglas Aircraft Company, Inc., Santa Monica, Calif., a corporation of Delaware Application July 17, 1939, Serial No. 284,860

14 Claims. (Cl. 89—37.5)

Our invention relates in general to armament for use on aircraft and the like, and relates in particular to an aircraft gun arrangement with an improved sighting means.

It is an object of our present invention to provide a gunnery device or gun emplacement especially suited to use on high speed aircraft wherein utmost stream-lining must be preserved if high speed and maneuverability are to be obtained efficiently. Any member, for example, a gun turret, which projects from the stream-lined body of an aircraft produces a drag which reduces the speed of which the aircraft would be otherwise capable. Our present invention makes possible the mounting of a gun of given size, for example, a machine gun, in a turret of minimum size and which has a minimum projection from the body of the aircraft. The present invention enables an appreciable reduction of the turret space for the reason that the pivotal gun mounting and the sighting means employed for the gun cooperate in such a manner that the gunner may occupy a small space and may control and sight the gun with a minimum of movement and effort. The invention also permits the gunner to sight the gun or aim it at the target in a natural manner, that is to say, with his line of vision extending at all times substantially parallel to the axis of the gun. Accordingly, the gunner, while looking out along the barrel of the gun may bring it approximately to bear on a target, and may then employ the gun sight to direct the aiming of the gun accurately upon the target.

It is an object of the invention to provide in a small turret which projects from the body of an aircraft, a gun pivotally mounted so that it may have universal movement for the purpose of aiming, and a gun sight associated with the gun, the eye piece of this gun sight having independent movement relative to the gun so that as the gun is moved from one position to the other the gun sight will be convenient to the optic of the gunner without the necessity for the gunner to assume an unnatural or strained position.

It is an object of the invention to provide with a gun, movably mounted for the purpose of aiming, a gun sight having a field piece connected to the gun so that the optical axis of the field piece or objective will be substantially in a prescribed alignment with the barrel of the gun, and an eye piece which is movable relative to the gun and the gun mounting so that the eye piece will be at all times convenient to the optic of the gunner, there being optical means between the view piece and the eye piece for transmitting to the eye piece the target image received by the view piece.

It is an object of the invention to provide a gunnery device especially suited for use in a small turret which projects down from the body of an aircraft. In such downward projecting turret it is desirable to have the gun mounted so that it will swing laterally around a substantially vertical axis and also downward from an approximately horizontal position to an approximately vertical position. A gunner, normally seated in an upright position may conveniently direct his line of vision out through a horizontal plane but when he desires to look down along a line which extends vertical or nearly so there is a natural forward leaning or bending of the body so that the head may be rotated on a horizontal axis to bring his line of vision into coincidence with the approximately vertical line along which he is to direct his sight.

It is a further object of the invention to provide a gunnery device wherein a gun is pivotally mounted for lateral movement and for movement from a substantially horizontal plane to an approximately vertical plane, the gun having associated therewith a sighting means with an eye piece movable relative to the gun and the gun support in such manner that the eye piece will be at all times convenient to the eye of the gunner as he normally changes his body position from one in which he may naturally look in a horizontal direction to one in which he may in a natural manner direct his vision along a non-horizontal line or vertically.

It is a further object of the invention to provide a gunnery device having a gun, a gunner's support, and a gun sight movably associated in such manner that as the gun is swung from one position to another for purpose of aiming, the gunner will be at all times supported in a convenient and non-strained position relative to the gun and the eye piece of the gun sight.

It is a further object of the invention to provide a gunnery device wherein a gun is pivotally mounted for aiming movement and wherein the gun may be swung from a horizontal plane to a substantially vertical plane, and wherein the gun, a gunner's seat, and a gun sight having a variable offset are cooperatively mounted for such relative movement that as the gun is swung down from horizontal position to vertical position, the gunner may, without assuming an abnormal position, keep his eye at the gun sight by merely leaning forward from an upright position in the gunner's seat, and when the gun is swung from downward directed position to horizontal position the gunner may keep his eye at the gun sight by merely straightening up from his forwardly leaning position.

It is a further object of the invention to provide a gun sight and associated gun wherein the gun may be mounted in a turret or enclosure of minimum size by reason of the fact that the eye piece of the gun sight is offset from the lateral plane of the gun and the view piece of the gun sight is offset from the eye piece so as to occupy a position close to the gun or on the opposite side of the gun from the eye piece.

It is a further object of the invention to provide in a gunnery device having a gun which is movable for purpose of aiming, an articulated gun sight having a view piece or objective which is connected to the gun so as to move in a fixed relation thereto and having an eye piece supported so as to have movement different from that of the view piece, means for holding the eye piece substantially parallel to the view piece and also a lens and reflector system which will keep the field or image of the gun sight from rotating as the respective parts thereof have angular movement.

Further objects and advantages of the invention will be brought out in the following part of the specification.

Referring to the drawings which are for illustrative purposes only:

Fig. 2 is a cross-sectional view taken on a plane represented by the line 2—2 of Fig. 1, showing the gunner seated in upright position.

Fig. 3 is a sectional view similar to Fig. 2, but showing the gun in downwardly directed position and the gunner leaning forward in his seat.

Fig. 4 is a cross-section taken substantially as indicated by the line 4—4 of Fig. 1.

Fig. 5 is a fragmentary sectional view taken as indicated by the line 5—5 of Fig. 4.

Fig. 6 is a schematic view indicating power control for imparting movement to the gun.

Fig. 7 is an enlarged fragmentary section taken on a plane represented by the line 7—7 of Fig. 2.

Fig. 8 is a diagram of the optical system employed in the articulated gun sight.

Figure 1:
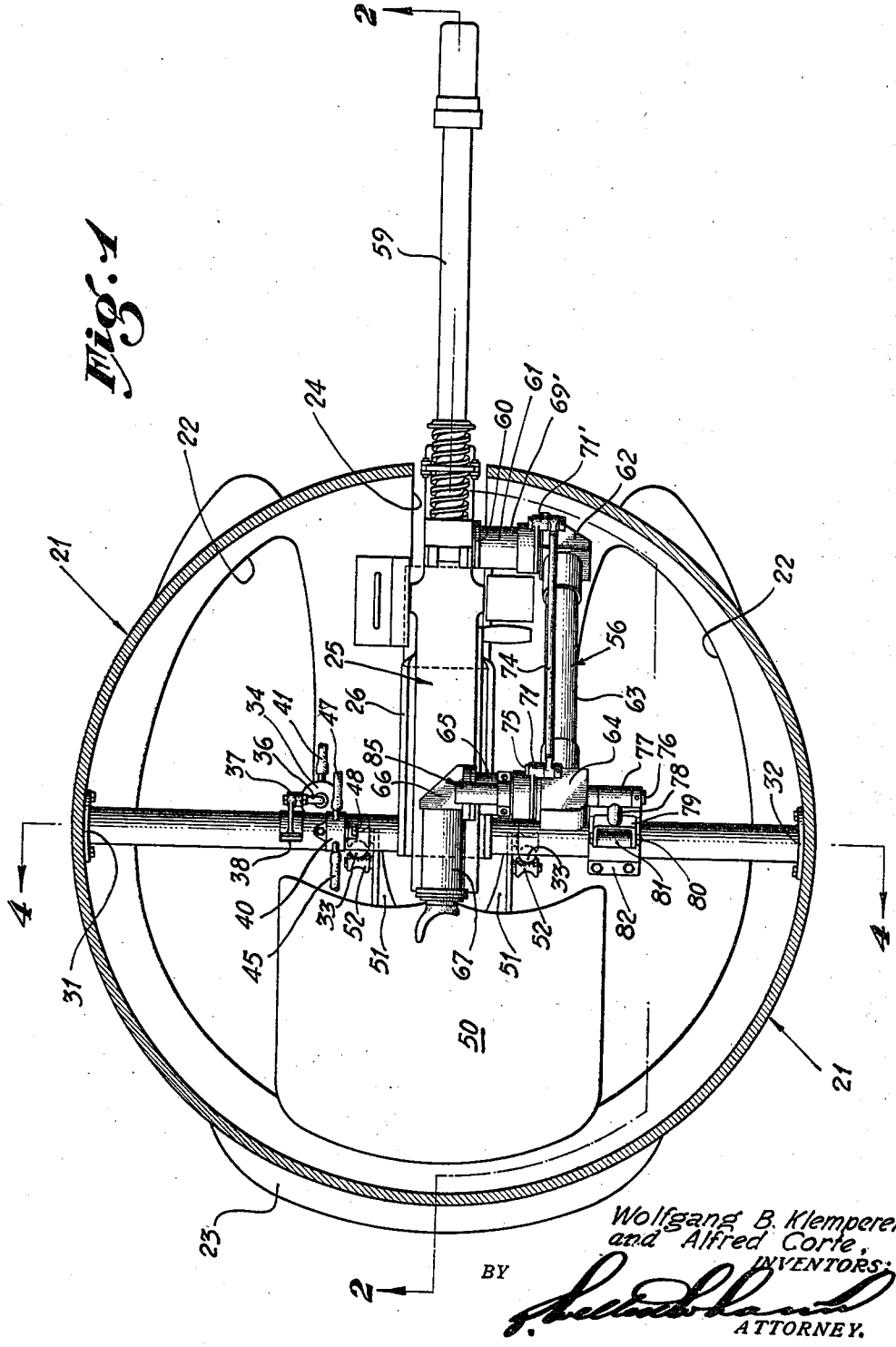
Fig. 1 is a plan view showing a gun emplacement or gunnery device embodying our present invention.

We have schematically shown the lower wall 20 of an aircraft body, such for example as the fuselage of an airplane, and a turret 21 projecting downward therefrom. This turret has an essentially spherical outer wall, with the exception that in the lower part thereof foot pockets 22 and a seat pocket 23 of stream-lined form are provided in the lower portions thereof. In accordance with practices known to the art, the turret 21 may be supported so as to have rotation on a vertical axis and any known means for rotating the turret may be provided. A gun slot 24 extends in a vertical plane between the foot pockets 22, from the upper edge of the turret 21 to a point near the center of the bottom of the turret, and a gun 25 is pivotally mounted within the turret 21, so that it may be swung from a position slightly above the horizontal position in which it is shown in Fig. 2, to a nearly vertical position as shown in Fig. 3.

The gun 25 is secured to a U-shaped yoke or bracket 26 so as to swing on a horizontal axis A—A, Fig. 4. The yoke 26 has oppositely projecting tubular shafts 27 and 28 which are rotatable in sleeves 29 and 30, these sleeves extending on the axis A—A and being secured at 31 and 32 to the side walls of the turret 21. The ends of the sleeves 29 and 30, adjacent the yoke 26 are supported by upright tubes 33 preferably spaced substantially equal distance from the vertical plane V—V in which the gun 25 swings on the axis A—A.

Power means for swinging the gun 25 on the axis A—A is provided, such power means, as shown in Figs. 4 and 6, a cylinder 34 having therein a double acting piston 35 which is connected by means of a rod 36 with a lever 37 which is connected to the shaft 27 and projects out through an opening 38 in the sleeve 29. The lower end of the cylinder 34 is pivotally connected to a bracket 39 mounted on the turret wall. A control valve 40 is mounted conveniently for operation by the gunner, for example, on the sleeve 29 adjacent the yoke 26, and from this control valve 40, as best shown in Figs. 5 and 6, conduits 41 and 42 are extended respectively to the upper and lower ends of the cylinder 34. The valve 40 is illustrated as being of four-way type, with a fluid pressure line 43 leading thereto from the fluid pressure chamber 44 supplied by a pump 47 from a receiver or sump 46 which is connected through a discharge conduit 45 with the valve 40. The gunner, by suitable operation of the handle 48, may rotate the plug 49 of the valve 40 so as to direct fluid under pressure to either conduits 41 or 42, to apply fluid pressure either above or below the piston 35, whereby to swing the gun 25 down or up as may be desired. It will be understood that power may be applied under control of the gunner to rotate the turret 21, whereby to swing the gun 25 horizontally.

A gunner's chair or seat 50 is supported for substantially vertical movement by carriages 51 having rollers 52 engaging diametrically opposite sides of the respective upright tubes 33. The gunner's seat 50 is connected with the gun moving mechanism in such a way that when the gun 25 is swung down from the position thereof in Fig. 2 to the position in which it is shown in Fig. 3, the seat 25 will be elevated for the purpose of keeping the gunner in such position relative to the butt of the gun 25 that he may conveniently sight the gun in either laterally or downwardly pointed position, as will be hereinafter explained in detail. To accomplish this vertical movement of the gunner's seat 50, a link 53 connects a post 54 on the forward part of the gunner's seat 50 with an arm 55 which extends from the yoke 26 in a direction toward the gunner occupying the seat 50. As the gun 25 is rotated down from its position of Fig. 2, to its position of Fig. 3, the link 53 will be carried upward and the seat 50 will be raised from its position of Fig. 2 to its position of Fig. 3. Accordingly, the gunner will be raised relative to the butt end of the gun 25.

Associated with the gun 25 there is a telescopic gun sight 56 having a view piece or objective 57 which is connected to the body of the gun 25 by means of a bracket 58 which forms part of the gun mount, thus securing the view piece 57 so that it will move with the gun 25 in a position below and substantially parallel to the barrel 59. At the rear end of the view piece 57 there is a housing 60 from which a tubular joint 61 extends, as shown in Fig. 1, so as to support a housing 62 in a plane lying adjacent one face of the gun 25. A tube 63 has its lower end rigidly secured to the housing 62 and extends diagonally rearward and upward across the face of the gun as shown in Fig. 2. A housing 64 is secured to the upper end of the tube 63, and this housing 64 is connected by means of a tubular structure or joint 65 with a housing 66 connected to the front end of an eye piece 67 positioned in the vertical plane of the gun 25 above the front ends thereof, and on the opposite side of the gun from the view piece 57. The housings 60, 62, 64, and 66 comprise optical elbows having suitable reflecting members therein, as will be hereinafter described.

The laterally extending tubular structures 61 and 65 are substantially identical in their construction; therefore, the illustration in detail of the upper tubular structure 65 in Fig. 7 will serve also for the tubular structure or joint 61. Referring to Fig. 7, the housing 64 has a tube 68 which projects therefrom into a tube 69 which is secured by threaded engagement 70 to the housing 66 at the rightward end of the eye piece 67. Accordingly, the tubular joint 65 comprises an inner tube 68 connected through the housing 64 to the upper end of the tube 63, this tube 68 being turnable within the outer tube 69 which is secured to the eye piece 67 through the housing 66. Through use of the outer tube 69, a lever 71 is connected in fixed relation to the eye piece 67. Likewise, a lever 71' is rigidly connected to the view piece 57 by reason of the fact that it is mounted on the outer tube 69', Fig. 1, which is connected through the medium of the housing 60 with the view piece 57, this tube 69' being the outer tube of the tubular structure 61. The manner of connecting the levers 71 and 71' respectively to the tubes 69 and 69' is shown in Fig. 7, wherein the lever 71 has a sleeve 72 which fits around the outer tube 69 and is held from rotation relative to the tube 69 by set screws 73. A link 74 connects through pins 75 at the ends thereof to the upper ends of the levers 71 and 71'. The relative length of the link 74 controls the relative swinging movement of the view piece 57 and the eye piece 67. The lever 71 may be longer or shorter than the lever 71' as conditions of installation may require. In the preferred practice of the invention these levers 71 and 71' are of equal length, thereby forming in conjunction with the tube 63 and the housings 62 and 64, a parallel link arrangement which will maintain the eye piece 67 parallel to the view piece 57 as the offset of the eye piece 67 relative to the view piece 57 changes.

The upper portion of the gun sight 56 is supported through use of a shaft 76, Fig. 7, which projects from the housing 64 on the axis of the upper tubular structure or joint 65. This shaft 76 projects into a sleeve 77 carried at the upper end of a link 78 having a fork 79 forming the lower portion thereof and connecting through a pin 80 with the upper end of a post 81 which is mounted by means of a clamp 82 on the sleeve 30 into which the tubular trunnion 28 of the gun mounting projects. The post 81 may be rotated for adjustment on the sleeve 30, and the height of the eye piece 67 when the gun 25 is in horizontal position as shown in Fig. 2 may be varied to suit the gunner 83 by selective use of openings 84 in the fork 79 of the link 78.

As shown in Figs. 1, 2, 3, and 7, a desiccator 85 is connected with the interior of the tubular structure of the gun sight, for the purpose of thoroughly drying any air which may enter the gun sight, thereby preventing the fogging of lenses due to the temperature changes to which the gun sight will be subjected in its ordinary use on an aircraft. We have shown this desiccator 85 mounted on a tubular structure 65 in a position convenient to the gunner. It comprises a shell 86 containing a body of water absorbing material 87, such as activated alumina, such material 87 being preferably contained in a replaceable cartridge 88. The shell 86 has an outer end wall 89 equipped with inlet and outlet valves 90 and 91, and the inner end 92 of the shell 86 fits into a cap 93 which is secured to the outer tube 69 and which is connected through a passage 94 with the interior of the tube 68. The cartridge 87 may be replaced by removing the shell 86 from engagement with the cap 93 to expose the inner end of the shell 86. As pressure changes occur in the gun sight, air may breathe in and out through the passage 94 and the desiccator 85. The incoming air, in passing through the water absorbing material 87, is dried so that moisture will not be carried into the interior of the gun sight 56.

As shown in Fig. 8 the articulated gun sight 56 has, in the view piece 57 thereof, an objective lens system 95 which forms a focal image 97, which image, as indicated at 98, is transmitted to a reflector 99 which may be either of prism or mirror type. The reflector 99, which is disposed within the housing 60 and thereby forms an optical elbow, reflects the image as indicated by broken lines 100 to a reflector 101 situated in the housing 62. The image is then transmitted as indicated by dotted lines 102 through the tube 63 to an erecting lens system 96 and thence to the reflector 103 disposed in the housing 64 at the upper end of the tube 63, from which it is in turn reflected as indicated at 104 through the upper tubular structure 65 to a reflector 105 mounted in the housing 66, which reflector 105 transmits the image 106 to the lens system 107 of the eye piece, in alignment with the eye of the gunner 83 seated in a natural manner in the seat 50. Two diametrically opposite reflectors, viz. 99 and 103, each have two successive reflecting surfaces and are shown as pentaprisms. By this arrangement the image is kept from rotating as the offset is varied.

The gun sight is provided with a suitable reticule in one of the focal planes of the lens system. This reticule is preferably in the focal plane 97 of the field piece 57. Such reticule comprises a frame 110 carrying the crossing strands 111 and 112 which form an aiming pattern in the field of vision of the gun sight. A particular feature of the device is the provision of means for laterally adjusting the reticule with respect to the axis of the gun, the vertical adjustment being accomplished through raising or lowering the field piece 57 with respect to the bracket 58 of the gun mount. For this purpose of lateral adjustment, the frame 110 is engaged on one side by an adjustment screw 113 and on the other by a spring 114 which holds the frame 110 against the end of the screw 113.

Among the valuable features of the present invention is the spacing of the view piece 57 in a position at least as low as the upper face of the part of the gun 25 which projects through the gun slot 24, as indicated in Fig. 2, so that the gun may be positioned as close as possible to the lower wall 20 of the aircraft body, and also the placing of the eye piece 67 in a position above the gun so that the gunner will require a minimum space below the gun. Accordingly, the projection of the cupola or turret 21 from the body of the aircraft is minimized and likewise, the gunner 83 occupies a position at the butt end of the gun such as normally assumed by a machine gunner.

As the gun 25 is swung down, under control of the gunner, from its position of Fig. 2, toward its position of Fig. 3, the axis of the shaft 76 traverses an arc 115 around the pivot pin 80 supported at the upper end of the post 81, the result being that the eye piece 67 is at this time moved toward the butt of the gun and also toward the gunner, but in parallel relation to the view piece 57 and the longitudinal axis of the gun 25 the downward swinging movement of the gun 25 is accompanied by an upward movement of the gunner's seat 50 so that as the position of the eye piece 67 changes, the gunner may readily keep his eye at the opening of the eye piece 67 by bending forward and also inclining his head in a natural manner. When the gun 25 reaches the position in which it is shown in Fig. 3, the gunner will be in the raised position indicated by dotted lines 83' and will have leaned forward to such position that his head and straight ahead line of vision is rotated substantially 90° from the position thereof in Fig. 2. It will be noted that the eye piece 67 is at this time close to the upper face of the gun so that the gunner may apply his eye thereto by leaning over in a manner such as he would normally assume were he to peer downward over the forward edge of any seat occupied by him. A reverse cooperative movement of the eye piece 67 and the gunner's seat 50 occurs when the gun 25 is swung upward from its position of Fig. 3 to and through the horizontal position thereof shown in Fig. 2.

We claim as our invention:

1. In a gunnery device of the character described, the combination of: a gun mounted so as to swing from one position to another; an articulated gun sight connected to the gun, said gun sight having a view piece connected to said gun so as to swing therewith and an eye piece movable relative to said gun; a gunner's seat movable toward and away from said gun; and means automatically moving said eye piece and said gunner's seat toward and away from said gun, as said gun is moved between different positions thereof.

2. In a gunnery device of the character described, the combination of: a gun mounted so as to swing about an axis and in a prescribed plane from a first position to a second position; an articulated gun sight connected to said gun, said gun sight having a view piece connected so as to move with said gun and an eye piece movable relative to said gun and toward and away from said axis; and means operating in consequence of the movement of said gun from said first position to said second position to move said eye piece of said gun sight toward said axis in a direction substantially parallel to said plane in which said gun is swingable.

3. In a gunnery device of the character described, the combination of: a gun mounted so as to swing about an axis and in a prescribed plane from a first position to a second position; an articulated gun sight connected to said gun, said gun sight having a view piece connected so as to move with said gun and an eye piece movable relative to said gun and toward and away from said axis; a gunner's seat movable toward and away from the butt of said gun in a direction substantially parallel to said plane; and means operating in consequence of the movement of said gun from said first position to said second position to move said eye piece of said gun sight toward said axis and said gunner's support toward the butt of said gun in a direction substantially parallel to said plane in which said gun is swingable.

4. In a gunnery device of the character described, the combination of: a gun mounted so as to be swung for purpose of aiming; means operative to move said gun; an articulated telescopic gun sight having in relatively movable relation a view piece and an eye piece, said view piece being in fixed relation to said gun and said eye piece being movable relative to said gun; and means for maintaining said eye piece parallel to said view piece.

5. In a telescopic gun sight of the character described for use with a gun mounted so as to swing about an axis, the combination of: a field lens; means to mount said field lens so that it may move in a fixed relation to said gun; an eye piece lens movable toward and away from said axis; means to maintain said eye piece lens in parallel relation to said field lens; and optical means to transmit to the eye piece lens the target image received by said field lens.

6. A gun emplacement for an aircraft, comprising: a turret projecting below a wall of the aircraft; a gun pivotally mounted in the turret and having means to vary the elevation thereof; a gunner's seat; means to raise or lower said seat as the elevation of said gun is lowered and raised; an articulated gun sight comprising several articulated parts including a view piece, an intermediate portion, and an eye piece; means for mounting said view piece on said gun; means for supporting said eye piece in movable relation to said gun; means operating to hold said eye piece in parallel relation to said view piece; and linkage means connecting the gun and said eye piece so as to move said eye piece toward said gun as the elevation of said gun is lowered.

7. In a gun emplacement for an aircraft, the combination of: a turret projecting below a wall of the aircraft; a gun pivotally mounted in said turret so as to vary the elevation thereof; a gunner's support in cooperative relation to the butt of said gun; an articulated gun sight having a view piece, an eye piece, and optical means to transmit to said eye piece the image received by said view piece; means for supporting said eye piece above the transverse plane defined by the axis of said gun; means for supporting the view piece offset from said eye piece and at least as low as said plane; and means for holding said eye piece parallel to said view piece.

8. In a gun emplacement for an aircraft, the combination of: a turret projecting below a wall of the aircraft; a gun pivotally mounted in said turret so as to vary the elevation thereof; a gunner's support in cooperative relation to the butt of said gun; an articulated gun sight having a view piece, an eye piece, and optical means to transmit to said eye piece the image received by said view piece; means for supporting said eye piece above the butt of said gun, and operating automatically to move said eye piece and said gunner's support toward and away from said gun as said gun is lowered and raised; and means for supporting the view piece.

9. In a gun emplacement for an aircraft, the combination of: a turret projecting below a wall of the aircraft; a gun pivotally mounted in said turret so as to vary the elevation thereof; a gunner's support in cooperative relation to the butt of said gun; an articulated gun sight having a view piece, an eye piece, and optical means to transmit to said eye piece the image received by said view piece; means for supporting said eye piece above the transverse plane defined by the axis of said gun, and operating automatically to move said eye piece toward and away from said gun as said gun is lowered and raised; and means for supporting the view piece on the lower face of said gun so as to move therewith as said gun is swung.

10. In a gunnery device of the character described, the combination of: a gun mounted so as to be swung for purpose of aiming; an articulated gun sight comprising a view piece, an eye piece, and optical means for transmitting to said eye piece the image received by said view piece; means supporting said eye piece on one side of said gun adjacent the butt thereof; means for mounting said view piece on said gun adjacent the barrel thereof and in offset relation to said eye piece and means to move said eye piece toward and away from the butt of said gun as the same is swung.

11. In a gunnery device of the character described, the combination of: a gun mounted so as to be swung for the purpose of aiming; a view piece mounted on one side of said gun adjacent the barrel thereof; an eye piece mounted on the other side of said gun adjacent the butt thereof; and means extending along and diagonally across a face of said gun, said means comprising optical means for transmitting to said eye piece the image received by said view piece.

12. In a telescopic gun sight of the character described, the combination of: a view piece; an intermediate section, an eye piece, said intermediate section being pivotally connected to said view piece and said eye piece by optical joints; and linkage connecting said view piece and said eye piece so that swinging movement of one of said pieces will be transmitted to and cause swinging movement of the other of said pieces.

13. A telescopic gun sight comprising a view piece; means to mount said view piece so that it may move in a fixed relation to a gun; an eye piece in offset relation to said field piece and movable relative to the gun; means to maintain said eye piece in general parallel relation to said view piece; means to vary the offset between said eye piece and said view piece; optical means comprising six reflecting surfaces to transmit to the eye piece the target field image received by said view piece without rotating the view field as the offset is varied; aiming pattern means in a focal plane of the optics of the telescope; and means to laterally adjust said aiming pattern with respect to the optical axis.

14. In a gunnery device of the class described, the combination of: a gun mounted so as to be swingable on an axis of rotation for the purpose of aiming; an articulated gun sight having a view piece section, an intermediate section and an eye piece section; means connecting said view piece section to said gun so that it will move with said gun as the gun is aimed; and means supporting said eye piece section adjacent the butt portion of the gun, said supporting means having parts cooperating to move said eye piece section toward and away from said axis of rotation as said gun is swung in opposite directions on said axis of rotation.

WOLFGANG B. KLEMPERER.
ALFRED CORTE.